United States Patent [19]
Toy

[11] 3,915,561
[45] Oct. 28, 1975

[54] PERISCOPIC VIEWING SYSTEM
[76] Inventor: William A. Toy, 459 Henley Drive, Bloomfield Hills, Mich. 48013
[22] Filed: Jan. 7, 1974
[21] Appl. No.: 431,369

Related U.S. Application Data
[62] Division of Ser. No. 215,498, Jan. 5, 1972, Pat. No. 3,754,288.

[52] U.S. Cl. ................ 350/301; 350/302; 350/299
[51] Int. Cl.² ........................................... G02B 5/08
[58] Field of Search ........... 350/288, 299, 303, 304, 350/286, 287, 301, 302, 52, 307

[56] References Cited
UNITED STATES PATENTS
| | | | |
|---|---|---|---|
| 3,058,395 | 10/1962 | Mattsson | 350/302 |
| 3,456,999 | 7/1969 | Hopp | 350/52 |
| 3,659,927 | 5/1972 | Moultrie | 350/286 |

Primary Examiner—Alfred E. Smith
Assistant Examiner—Michael J. Tokar
Attorney, Agent, or Firm—Gifford, Chandler & Sheridan

[57] ABSTRACT

A periscopic rear view optical system for vehicles in which an image of a rearward objective is reflected downwardly from a rooftop mirror through a prismatic device constructed as a transparently faced housing filled with a liquid suitable for the optical path to be within the critical angle at the desired reflective faces for reflection of the image to the driver of the vehicle. A modification of the device includes adjustable prism faces to accommodate different driver heights, with the spatial dimension variations produced by the adjustment effecting a vertical movement of the device.

8 Claims, 3 Drawing Figures

PERISCOPIC VIEWING SYSTEM

RELATIONSHIP TO OTHER APPLICATIONS

This is a divisional application from my co-pending application Ser. No. 215,498 filed Jan. 5, 1972 and now U.S. Pat. No. 3,754,288.

BACKGROUND OF THE INVENTION

A. Field of the Invention

My invention relates to optical systems, and more particularly to a periscopic rear view optical system for vehicles.

B. Description of the Prior Art

Interior center mounted and exterior side view mirrors, presently in use in automotive vehicles, present various design problems and have inherent safety deficiencies and other disadvantages. A primary design limitation for such mirrors is the requirement that the straight-line path from the observer to the mirror and from the mirror to the objective be unobstructed. Partial obstruction in this path such as is caused by vehicle structure produces blind spots which are often hazardous. Further, such mirrors themselves obstruct the operator's forward field of view and the reflected image in the mirror may camouflage the forward blind spot and present a dangerous situation, particularly with respect to pedestrians. Present mirrors further provide only a relatively small view of the rearward scene, leaving blind spots on either side.

In early years of automobile manufacture when traffic was comparatively light, body designs of vehicles using center mounted mirrors were tall and box shaped. A mirror could be relatively large and be mounted in a high position to avoid many of the aforesaid problems. Newer vehicles have been designed with lower roof lines in order to achieve lower centers of gravity and smaller frontal areas, lowering the rear window dimensions. The center mounted rear view mirror must thus be placed much lower, which produces the deficiencies and disadvantages previously described. Enlarging the mirrors to cover a wider field of view is impractical because obstruction of the forward view and the associated danger would be increased. In addition, interior mirrors are inherently dangerous in case of accident.

Attempts to overcome these problems have taken many forms. Convex mirrors, for example, have been tried, but these not only distort the image but also produce unrealistic depth perception which itself is dangerous. Additional side view mirrors can further obstruct the forward field of view and require the operator to continuously shift his sight between two or more mirrors, distracting him from attention to the scene ahead. Side view mirrors of the size in use today provide essentially monocular viewing, and hence eliminate the necessary depth perception. Further, at night such side view mirrors reflecting lights from rearward vehicles have a blinding effect. Other disadvantages of side view mirrors are that they may be obstructed by vent window structure and being relatively low to the ground they are readily dirtied in wet weather by spray from vehicle wheels, as well as contributing to safety hazard in case of an accident.

Recently, overhead periscopic mirrors have been recognized as providing the most likely solution to these problems, but most proposed designs present many problems of their own. For example, since a two mirror system inverts the rear image, a third image correcting mirror must be introduced. However, since the mirrors must be so located to prevent one from obstructing the line of sight of another, they need to be fairly widely separated, hence lengthening the sight line and the associated "tunnel" vision effect. If the mirrors are of moderate size, the operator experiences difficulty in keeping the image framed by the mirrors in line, while if the mirrors are made extremely large then innumerable difficulties in vehicle construction, mirror mounting and the like are experienced. In addition, large mirror costs may make them prohibitive.

High cost associated with prisms of reasonable quality and sufficient size is also a problem with various resorts to prism systems.

In my co-pending application Ser. No. 128,498 filed Mar. 26, 1971 and now U.S. Pat. No. 3,704,062 as a continuation of application Ser. No. 779,922 filed Nov. 29, 1968, I proposed a solution to the various problems by introducing the concept of an intermediate beam-splitter mirror, enabling the vehicle driver to look through it to a first mirror from which the reflection of the rearward image downwardly by the rooftop mirror is specularly reflected from the beam-splitter mirror. The mirrors may now be mounted in close juxtaposition to eliminate the "tunnel" vision problem and permit relatively moderately sized mirrors to produce an extremely wide angle field of view. However, the system's light transmission is somewhat limited by the beam-splitter and various ghost images being reflected to the driver need to be masked.

Numerous rear view mirror and optical systems are described, and their deficiencies made apparent, in the Report PB186228 entitled *Motor Vehicle Rear Vision* prepared for National Highway Safety Bureau, U.S. Department of Transportation, and published by the U.S. Department of Commerce.

SUMMARY OF THE INVENTION

Extensive study of rear view observation systems, particularly relating to human engineering factors and to the practicalities of modern vehicle design and manufacturing requirements, involving cost as well as other considerations, have led me to the conclusion that, in order to have the capability for achieving a high light transmission rate, along with the various optical advantages inherent in the system of my prior co-pending patent application, a prism type of system would seem to be the best from all standpoints. However, a study of prisms, as presently proposed for periscopic systems, indicates that they have drawbacks in the fact that normal prisms are extremely expensive in the size needed, and for use by vehicle drivers who vary to a great degree in height they are limited as to adjustability. Therefore, the present invention proposes to use a prismatic system constructed as a transparent faced housing or housings filled with a liquid having an index of refraction suitable for the optical path to be within the critical angle at the desired reflective faces. For example, plate glass, which has the optical flatness required in prism faces and is of relatively low cost, can be constructed to form a housing and be filled with a liquid such as sugar water. In order to keep chromatic and spherical aberrations within acceptable limits, it is necessary that the entrance and exit faces of the prism, or combined prism faces, be maintained optically parallel at all times. Adjustability is now available by variably tilting two of the faces of the prism in such a manner that the optical parallelism is maintained.

As presently conceived, the housing is made in two sections, namely a main prism section and an optical wedge. The main prism section has an upper image receiving face, a sloped face which specularly reflects the image forwardly to a back surface mirror face, which thence reflects the image through the sloped face and through the adjacent optical wedge having a viewing face presented to the vehicle driver. The interior of both the main prism and the optical wedge are filled with the desired liquid.

Such a prismatic system by itself serves the purpose of a rear view periscope and has the capability of a comparatively high light transmission rate, but it is desirable to incorporate adjustment features. This is readily accomplished in my invention by making two of the faces adjustable relative to the other faces. I have chosen to make the viewing face of the optical wedge and the mirrored surface of the main prism adjustable by connecting them to the bodies of the housing by flexible bellows or rolling flexible seals. In order to maintain optical parallelism of the viewing face of the optical wedge and the upper horizontal image receiving face, it is necessary to adjust the mirrored face at one-half the rate of the viewing face, which can be accomplished through a simple mechanical or other preferred device. The mirrored face, alternately, could be carried interiorly and adjusted without the need of special flexible seal.

An added dividend in the adjustable face feature is that in maintaining a constant total volume within the housings, instead of using an interconnected separate expansible chamber, the main bodies of the prismatic structure are made to adjust vertically relative to the upper image receiving face in maintaining a constant total interior volume. This adjustment automatically lowers the prismatic device for shorter drivers and raises it for taller drivers. The image transmitted into the device through the upper horizontal receiving face is reflected from a higher roof-mounted mirror sloped upwardly toward the rear of the vehicle. If desired, the upper mirror could be enclosed with a rearward directed receiving face, and the horizontal faces previously described eliminated entirely so that the main prism housing would have an upper specularly reflective face. In this case, the viewing face of the optical wedge and the rearward face adjacent the upper reflective face would have to be maintained optically parallel at all times. However, as a practical matter, the added weight of fluid is probably not worth the advantage of eliminating the upper mirrored surface.

DESCRIPTION OF THE DRAWING

For a more complete understanding of the invention, reference may be had to the accompanying drawing illustrating preferred embodiments of the invention, in which like reference characters refer to like parts throughout the several views and in which.

DESCRIPTION OF THE PREFERRED EMBODIMENTS

Figure 1:
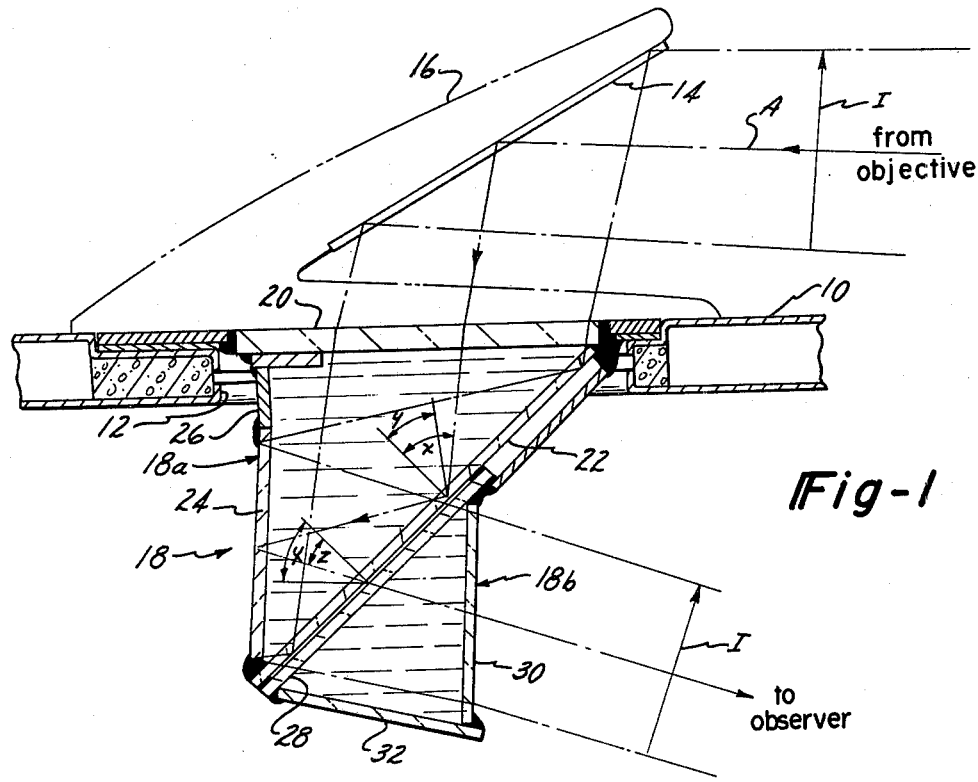
FIG. 1 is a vertical cross-sectional diagrammatic view of a simplified periscopic system embodying the present invention.

FIG. 1 illustrates a vehicle roof 10 provided with an aperture 12 above which is disposed a rear surface mirror 14 preferably carried by a support structure 16 (phantom line).

A prismatic structure 18, comprising a main prism housing 18a and an optical wedge housing 18b secured together as a unit, is supported within and depending from the aperture 12 as indicated.

The main prism housing 18a incorporates an upper preferably horizontal transparent image receiving face 20 preferably mounted flush with the upper surface of the vehicle roof 10, a transparent prism face 22 depending from closely adjacent the rear edge of the face 20 and sloping forward, and a forwardly disposed rear surface mirror face 24 depending from housing structure 26, with its lower edge being disposed closely adjacent the lower forward edge of the prism face 22.

The optical wedge housing 18b incorporates a forward sloped transparent prism face 28 parallel with and spaced slightly from the prism face 22 of the main prism housing 18a, and a transparent viewing face 30 depending from closely adjacent the upper rear edge of the prism face 28 and diverging therefrom, the lower edges of the faces 28 and 30 being sealed to a lower housing structure 32.

All of the faces 20, 22, 28 and 30 through which light will pass are preferably of substantially the same index of refraction as is the liquid medium and will preferably be flat plate glass. The liquid with which the interior of the housings 18a and 18b are filled has the desired index of refraction so that the appropriate critical angle of the interior light rays is achieved at the outer glass surface so in total the housing and faces constitute ordinary prisms, but plate glass and the necessary liquid, which might be ordinary sugar water, are much less costly than any solid prism, and have been found to perform very satisfactorily. The expense of solid prisms arises from the fact that the glass or other material must be substantially flawless, and the prism faces must be ground and polished flat to a high degree of accuracy. Plate glass, on the other hand, is normally made flat with the requisite degree of accuracy, while the liquid has high light transmitting quality and can represent a flawless mass.

In operation, an image I from the objective viewed along the optical axis designated by the intermediate phantom line A is reflected first from the upper mirror 14 downwardly through the image receiving face 20 for refraction to the main prism face 22 at an angle which is greater than the critical angle $y$ of the face 22 so that the image is totally specularly reflected, with no light transmission loss, forward to the mirror face 24, from which the image reflects rearwardly to the prism face 22 at an angle $z$ which is less than the critical angle $y$ as indicated, so that it transmits through the face 22.

Since the faces 20 and 22 are not optically parallel, the light exiting through the face 22 would normally be diffracted. Therefore, the optical wedge 18b is required, with the face 28 being parallel to the main prism face 22 and the face 30 being optically parallel with the main prism face 20 (i.e., the optical axis A at the faces 20 and 30 are at the same angle), so that the image is refracted through the faces 28 and 30 for viewing by the observer without resultant optical defraction and its associated chromatic aberration. As will be seen, the image indicated by the arrow I is oriented by the device to be viewed in its normal upright position and, since the prism face 22 both reflects and transmits the image, it can be disposed closely adjacent the mirror 24 so that the length of the optical axis is reduced in comparison to an optical axis reflecting between ordinary mirrors which would necessarily be separated from each other to avoid the obstruction of one mirror by another.

Figures 2, 3:
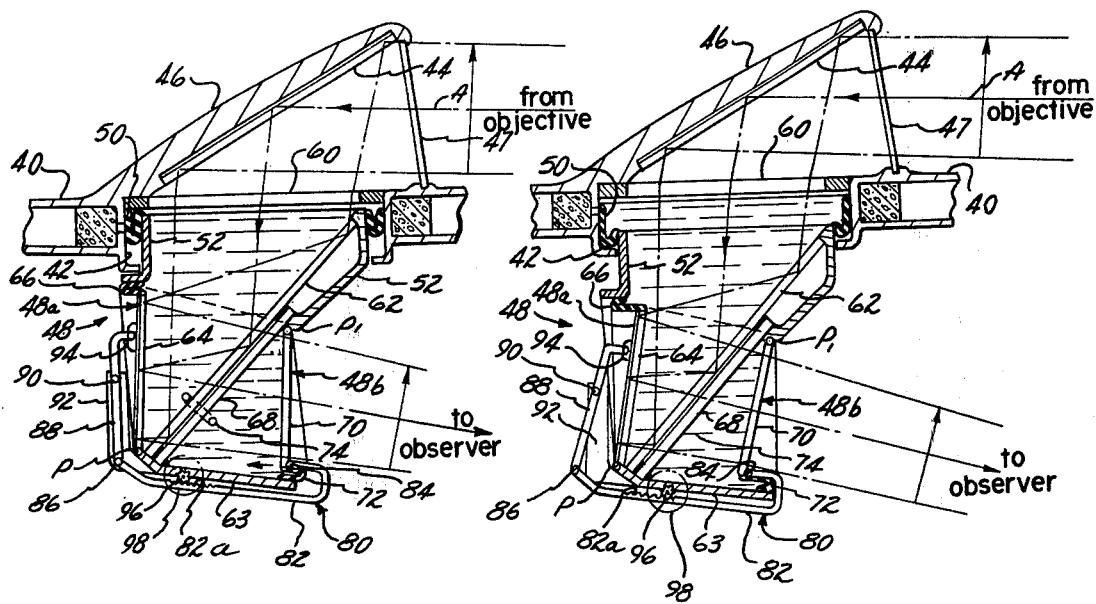
FIG. 2 is a vertical cross-sectional diagrammatic view of another embodiment of the invention showing the system in one adjusted position.
FIG. 3 is a vertical cross-sectional diagrammatic view of the system of FIG. 2 illustrating it in a second adjusted position.

FIGS. 2 and 3 illustrate a modification incorporating the principles described in relation to FIG. 1, but in which the optical axis is adjustable for accommodating different observer eye positions. As shown, a vehicle roof 40 is provided with an aperture 42 above which is disposed a rear surface mirror 44 preferably carried by a support structure 46 optionally having a rear transparent window face 47. A prismatic structure 48, comprising a main prism housing 48a and an optical wedge housing 48b secured together as a unit, is supported within and depending from the aperture 42 by means of a flexible bellows or rolling flexible seal 50 peripherally secured at one end to an upper main prism housing frame structure 52 and at the other end peripherally to the inner surface of the aperture 42 as indicated.

The main prism housing 48a incorporates an upper preferably horizontal transparent image receiving face 60 preferably mounted flush with the upper surface of the vehicle roof 40, a transparent prism face 62 having its upper edge mounted to the upper rearward edge of the housing frame structure 52 and sloping downward and forwardly therefrom, and a rear surface mirror 64 having its lower edge pivotally secured as at P to a lower housing structure 63 closely adjacent the lower edge of the prism face 62 and its upper and side edges secured to one end of a flexible bellows or rolling flexible seal 66 whose other end is secured to a lower flange portion of the housing frame structure 52.

The optical wedge housing 48b incorporates a transparent prism face 68 having its upper edge secured to a rear edge of the structure 52 and its lower edge secured to the forward side of the housing structure 63 to be disposed closely adjacent and parallel to the main prism face 62 as shown, and a viewing face 70 having its upper edge pivotally secured as at P' to the structure 52 closely adjacent the upper edge of the face 68 and its lower and side edges secured to one end of a flexible bellows or rolling flexible seal 72 whose other end is secured to the rear side of the housing structure 63. The housings 48a and 48b are filled with any preferred fluid having the desired index of refraction when the index of refraction of transparent faces 60, 62, 68 and 70 are considered and are openly connected through any means such as a passage 74 so that, on adjustment as will be explained hereafter, the liquid may flow between the housings as their volumes respectively change.

The mirror face 64 is angularly adjustable relative to the face 62 of the main prism housing to vary the optical axis A through the device as will be seen on comparison of the positions shown in FIGS. 2 and 3. The viewing face 70 of the optical wedge housing 48b is also adjusted to vary its angle relative to the face 68 in order to maintain the viewing face 70 optically parallel with the image receiving face 60 as the optical axis changes. These adjustments are possible due to the provision of the flexible seals 66 and 72 which provide a flexible sealing joint between the respective faces and the housing structure.

In the present device as disclosed, adjustment of the viewing face 70 must be at twice the rate of adjustment of the mirror face 64 in order to maintain the necessary optical parallelism of the receiving and viewing faces 60 and 70, and this is achieved by any desired mechanism such as the linkage system 80 shown, which comprises a link member 82 pivotally connected at one end as at 84 to the lower edge of the viewing face 70 and at the other end as at 86 to a lower end of a lever 88 in turn pivotally fulcrummed as at 90 on a bracket 92 or the like supported by the main prism housing 48a. The other end of the lever 88 is pivotally secured as at 94 to the outer side of the mirror face 64. The link member 82 is preferably provided with a toothed rack 82a engaged with a spur gear 96 rotatable by a suitable knob 98. As can be seen, rotation of the knob 98 actuates the link member 82 to directly angularly adjust the viewing face 70 and to adjust the mirror face 64 through the lever 88 in the desired ratios.

As the spatial dimensions of the housings 48a and 48b change from the position of FIG. 2 to the position of FIG. 3, varying their respective volumes, liquid will flow from the housing 48b through the passage 74 into the housing 48a. This causes the entire prismatic structure 48 to move downwardly relative to the upper image receiving face 60 to compensate for the inward movements of the faces 64 and 70 and maintain the total volume within the housings constant. This lowering of the structure 48 from the position of FIG. 2 to that of FIG. 3 tends to move the viewing face 70 to a more convenient height for shorter drivers, and the reverse motion upwardly from the position of FIG. 3 to the position of FIG. 2 tends to keep the device from obstructing forward vision of a taller observer.

Although I have preferred to vary the angular relationships of the viewing face and the mirror face 64 relative to the other faces of the prismatic sttucture 48, any two of the faces could be adjusted to achieve the same result, so long as the faces 68 and 62 remain essentially parallel to each other and the faces 60 and 70 remain optically parallel at all times.

Also, the forward side of the housing frame 52 could extend downwardly all the way to form a solid wall of the main prism housing 48a, with the mirror face 64 being carried inside between such forward wall and the face 62, being adjusted in substantially the same fashion as shown in FIGS. 2 and 3 but entirely inside of the liquid filled structure, thus eliminating the need for the flexible seal 66.

Further, the upper rear window 47 could become a prismatic image receiving face, with the face 60 shown in FIGS. 2 and 3 being eliminated, the liquid then filling the entire volume above the roof line. Also, in such a case, the mirror face 44 could be a flat glass plate or other transparent member forming a prism face at an angle such that the optical axis will be directed to it at greater than the critical angle for specular downward deflection. It will be noted also that in such a case the faces 47 and 70 would have to be maintained optically parallel, i.e., the refraction encountered by a light ray at 47 would be compensated for at 70 as with the faces 60 and 70 in FIGS. 2 and 3. The structure of FIG. 1 could similarly be modified to add a rear window and remove the upper face 20. However, as a practical matter, the added weight of liquid in the upper space above the roof line might not compensate for the increased transmission capabilities and other advantages of such a modification.

For reasons of automotive styling when air drag is considered and for cost considerations, it is important to keep the size of the external parts as small as possible. An additional feature of the invention is the fact that light rays upon entering the prism medium bend toward the normal, which has an effect similar to further shortening of the optical path and makes it possible to use a smaller top mirror in attaining a given field of view under constant conditions.

Although I have described and shown only a few possible embodiments of the invention, it will be apparent to one skilled in the art to which the invention pertains that various other changes and modifications may be made therein without departing from the spirit of the invention or the scope of the appended claims.

I claim:

1. In a periscopic viewing apparatus
   a prismatic structure having an image receiving face, interiorly reflective faces, and a viewing face, the image received through said receiving face being transmitted to said reflecting faces and thence outwardly through said viewing face,
   said prismatic structure further comprising a housing and an optical wedge, said interiorly reflective faces being a part of said housing and said viewing face being a part of said optical wedge,
   said housing having a chamber containing light transmitting liquid having the necessary index of refraction when combined with said faces to effect prismatic performance of said structure.

2. The apparatus as defined in claim 1 and wherein said wedge comprises a housing having a chamber, said chamber being defined in part by said viewing face, said housing including a light transmitting face disposed adjacent one of the reflective faces of said first mentioned housing, said chamber being filled with a light transmitting liquid having the necessary index of refraction when combined with said wedge faces to effect prismatic performance of said wedge.

3. The apparatus as defined in claim 1 and in which said faces comprise plate glass and said liquid comprises sugar water.

4. The apparatus of claim 1 wherein said faces are all planar.

5. The apparatus of claim 1 wherein said faces comprise plate glass.

6. The apparatus of claim 1 wherein at least some of said faces comprise planar light transmitting elements.

7. The apparatus of claim 1 and including means permitting at least two of said faces to be adjustable angularly with respect to other faces.

8. The apparatus of claim 1 and including means permitting some of said faces to be vertically movable relative to another face.

* * * * *